United States Patent [19]

Ueki et al.

[11] Patent Number: 4,972,739

[45] Date of Patent: Nov. 27, 1990

[54] LINE PRESSURE CONTROL ARRANGEMENT FOR AUTOMATIC TRANSMISSION

[75] Inventors: Akihiro Ueki, Zama; Kazuhiko Sugano, Yokohama, both of Japan

[73] Assignee: Nissan Motor Co., Ltd., Yokohama, Japan

[21] Appl. No.: 264,704

[22] Filed: Oct. 31, 1988

[30] Foreign Application Priority Data

Oct. 30, 1987 [JP] Japan .................. 62-273221

[51] Int. Cl.$^5$ ............... F16H 59/14; F16H 59/70
[52] U.S. Cl. ..................................... 74/868; 74/867
[58] Field of Search ............... 74/867, 868, 752 C; 475/64

[56] References Cited

U.S. PATENT DOCUMENTS

| | | | |
|---|---|---|---|
| 3,738,198 | 6/1973 | Kell | 74/752 C X |
| 3,840,039 | 10/1974 | Shellman | 74/867 X |
| 3,893,472 | 7/1975 | Schuster | 74/867 X |
| 4,139,015 | 2/1979 | Sakai | 74/867 X |
| 4,462,280 | 7/1984 | Sugano et al. | 74/867 X |
| 4,506,564 | 3/1985 | Coutant | 74/868 X |
| 4,534,243 | 8/1985 | Yokoyama et al. | 74/868 |
| 4,672,862 | 6/1987 | Chama | 74/867 X |

FOREIGN PATENT DOCUMENTS

60-1444  1/1985  Japan .

Primary Examiner—Rodney H. Bonck
Assistant Examiner—Khoi A. Ta
Attorney, Agent, or Firm—Foley & Lardner, Schwartz, Jeffery, Schwaab, Mack, Blumenthal & Evans

[57] ABSTRACT

A second spool valve element which is engageable with the one which actually controls discharging of hydraulic fluid in a manner which controls the level of the line pressure, has first and second lands, the first and second lands defining a pressure differential area which can be exposed to a first control pressure indicative of the transmission being shifted out of D range into a lower one, in a manner to bias the second valve toward the first spool valve element; a chamber is defined in the valve bore to which the engageable ends of the first and second spools are exposed and which is supplied with a second control pressure indicative of the torque being applied to the tranmission, the second control pressure producing a bias which tends to move the the first and second spool valve elements apart.

10 Claims, 5 Drawing Sheets

| | | R/C | H/C | F/C | O/C | B/B 2A | B/B 3R | B/B 4A | L&R/B | F/O | L/O | GEAR RATIO | $\alpha_1 = 0.45$ $\alpha_2 = 0.45$ |
|---|---|---|---|---|---|---|---|---|---|---|---|---|---|
| D RANGE | ENGINE DRIVING | 1 ST | | | ○ | | | | | | ○ | ○ | $\dfrac{1+\alpha_1}{\alpha_1}$ | 3.22 |
| | | 2 ND | | | ○ | | ○ | | | | ○ | | $\dfrac{\alpha_1+\alpha_2+\alpha_1\alpha_2}{\alpha_1(1+\alpha_2)}$ | 1.69 |
| | | 3 RD | | ○ | ○ | | | | | | ○ | | 1 | 1 |
| | | 4 TH | | ○ | (○) | ○ | | ○ | | | | | $\dfrac{1}{1+\alpha_2}$ | 0.69 |
| | ENGINE BRAKING | 1 ST | | | (○) | | | | | | | | | |
| | | 2 ND | | | (○) | ○ | ○ | | | | | | | |
| | | 3 RD | | ○ | (○) | ○ | ○ | ○ | | | | | | |
| | | 4 TH | | ○ | (○) | ○ | | ○ | | | | | | |
| 2 ND RANGE | | 1 ST | | | ○ | | | | | | ○ | ○ | | |
| | | 2 ND | | | ○ | | ○ | | | | ○ | | | |
| 1 ST RANGE | | 1 ST | | | ○ | | | | | ○ | ○ | | | |
| REVERSE | | 1 ST | ○ | | | | | | | ○ | | | $-\dfrac{1}{\alpha_2}$ | −2.22 |

( ) UNRELATED TO POWER TRANSMISSION

LINE PRESSURE CONTROL ARRANGEMENT FOR AUTOMATIC TRANSMISSION

BACKGROUND OF THE INVENTION

1. Field of the Invention

The present invention relates generally to a pressure regulator valve for controlling the level of the line pressure which is used to engage the friction elements of an automatic automotive transmission and more specifically to a pressure regulator valve which can regulate the level of the line pressure in a manner wherein a manually induced downshift from D range for the purposes of obtaining engine braking and the like, does not induce severe shift shock and wherein adequate friction element engagement under modes wherein a relatively large amount of torque is required to be transmitted through the transmission is obtained.

2. Description of the Prior Art

JP-A-60-1444 discloses a previously proposed line pressure control arrangement wherein when the transmission is conditioned to produce the D range the level of the line pressure is changed in accordance with the level of the throttle pressure and when the transmission is conditioned to produce the manual 2nd speed range the level of the line pressure is held at a predetermined level and unaffected by the changes in throttle pressure.

The reason for this control is that when the transmission is shifted into manual 2nd speed range to produce engine braking the level of throttle pressure reduces to zero and the level of line pressure tends to fall to its minimum level. Accordingly, the pressure which is supplied to the friction elements which are engaged during this mode is insufficient and slippage tends to occur. For this reason it is necessary to set an arbitary predetermined limit of the line pressure in order to enable the friction elements to transmit the required amount of torque.

However, this arrangement has suffered from the drawback that while the predetermined level is sufficient for engine braking (which occurs with a zero throttle pressure level) in the event that the engine throttle valve is moved to a wide open position the amount of torque which needs to be transmitted exceeds that which can be transmitted by the friction elements engaged with said predetermined pressure level.

If the level is raised to a relatively high value in order to compensate for the above shortcomming, when the transmission is shifted from D range to the manual 2nd speed range, the high pressure level which is induced tends to produce a strong shift shock.

SUMMARY OF THE INVENTION

It is an object of the present invention to provide a pressure regulator arrangement which can regulate the level of the line pressure in a manner wherein a downshift select from the D range does not induce severe shift shock and wherein adequate friction element engagement under modes wherein a relatively large amount of torque is required to be transmitted through the transmission is ensured during the selected mode.

In brief, the above object is achieved by an arrangement wherein a second spool valve element which is engageable with the one which actually controls discharging of hydraulic fluid in manner which controls the level of the line pressure, has first and second lands, the first and second lands defining a pressure differential area which can be exposed to a first control pressure indicative of the transmission being shifted out of D range into a manual forward speed one, in a manner to bias the second valve toward the first spool valve element; and a chamber defined in the valve bore to which the engageable ends of the first and second spools are exposed and which is supplied with a second control pressure indicative of the torque being applied to the transmission, the second control pressure producing a bias which tends to move the first and second spool valve elements apart.

More specifically, a first aspect of the present invention is deemed to comprise a line pressure regulator valve for the hydraulic control system of an automatic transmission, the valve being characterized by, a first spool valve element for regulating the level of the line pressure, a second spool valve element which is engageable with the first spool valve element, the second spool element having first and second lands, the first and second lands defining a pressure differential area which can be exposed to a mode selection pressure in a manner to bias the second valve toward said first spool valve element; and means defining a chamber to which the engageable ends of the first and second spools are exposed and which is supplied with a pressure which varies with the torque being applied to the transmission and which biases the first and second spools apart.

A second aspect of the present invention is deemed to comprise a transmission which can be selectively induced to produce first and second modes of operation, the second mode of operation being one in which engine braking can be produced, the transmission featuring: a pump which discharges hydraulic pressure under pressure; a first source of pressure indicative that the second mode of operation has been selected; a second source of pressure which varies with the torque applied to the transmission; and a pressure regulator valve for regulating the pressure of the hydraulic pressure discharged by the pump, the regulator valve including a first spool valve element reciprocatively disposed in a bore, the first spool valve element being arranged to control the level of the hydraulic pressure discharged by the pump, the first spool defining a first chamber in the bore which is supplied with the regulated pressure produced by the regulator valve and arranged in a manner wherein the pressure which prevails in the first chamber produces a bias which tends to move the first spool in a first direction in the bore, the first spool being arranged so that when it is moved in the first direction, the amount of pressure which is relieved is increased and the level of the regulated pressure is reduced; a second spool valve element reciprocatively disposed in the bore, said second spool including means which defines a pressure differential area, the pressure differential area being exposed to said second mode indicating pressure, the second mode indicating pressure producing a bias which tends to move the second spool in a second axial direction in the bore, the second spool valve element having a first end which is engageable with a first end of said first spool, said first and second ends being arranged in the bore manner to define a second chamber which is exposed to the torque indicative pressure, the torque indicative pressure producing biases which tend to move the first spool in the second axial direction the the second spool in the first axial direction; and a spring, the spring being disposed in said bore and arranged to bias the first spool in the second axial direction, the first and second spools and the spring being arranged so that when the torque indicative pressure is below a predetermined level and the transmission is conditioned to produce the second mode of operation, and the second mode indicative pressure is applied to the pressure differential area, the first end of said first spool is engaged by the first end of the second spool and operation of the first spool is modified such that the regulated pressure discharged said regulator valve is held essentially constant until the torque indicative pressure rises to the predetermined level.

A third aspect of the present invention is deemed to include a control system for an automatic transmission which features, a plurality of friction elements, a pump for discharging hydraulic fluid under pressure, a manual valve which can be set in at least first and second positions, the first position being arranged to condition said transmission to selectively engage the plurality of friction elements in a manner to produce a first mode of transmission operation wherein automatic shifting between a plurality of gear ratios is possible, the second position being arranged to condition said transmission in a manner to produce s second mode of transmission operation wherein the top speed ratio of the transmission is inhibited and engine braking rendered possible, the manual valve being arranged to produce a first control signal when set in the second position; a throttle pressure control arrangement which produces a second control pressure which varies in accordance with the torque applied to the transmission; and a line pressure regulator valve for controlling the discharge of said pump in a manner to develop and control the level of a line pressure which is used to engage the friction elements, the line pressure regulator valve comprising; a first spool valve element for regulating the level of the line pressure, the first spool being responsive to the level of the line pressure produced by the line pressure regulator valve in a manner to be feedback controlled by the same; a second spool valve element which is engageable with the first spool valve element, the second spool element having first and second lands, the first and second lands defining a pressure differential area which can be exposed to the first control pressure in a manner to bias the second valve toward the first spool valve element; and means defining a chamber to which the engageable ends of the first and second spools are exposed and which is supplied with the second control pressure, the second control pressure biasing the first and second spool valve elements apart.

DETAILED DESCRIPTION OF THE PREFERRED EMBODIMENTS

Figure 2:
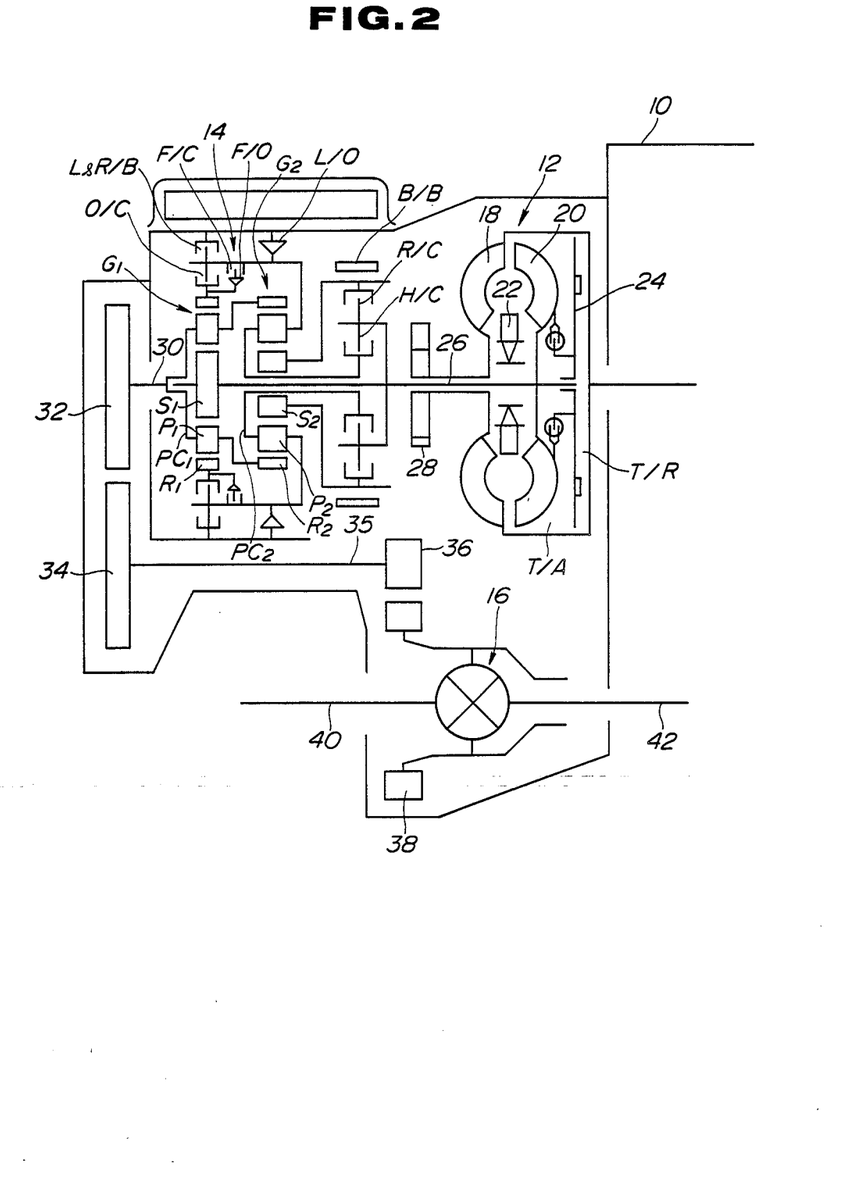
FIG. 2 is a schematic elevation of a transaxle of the type to which the present invention can be applied.
Figure 3:
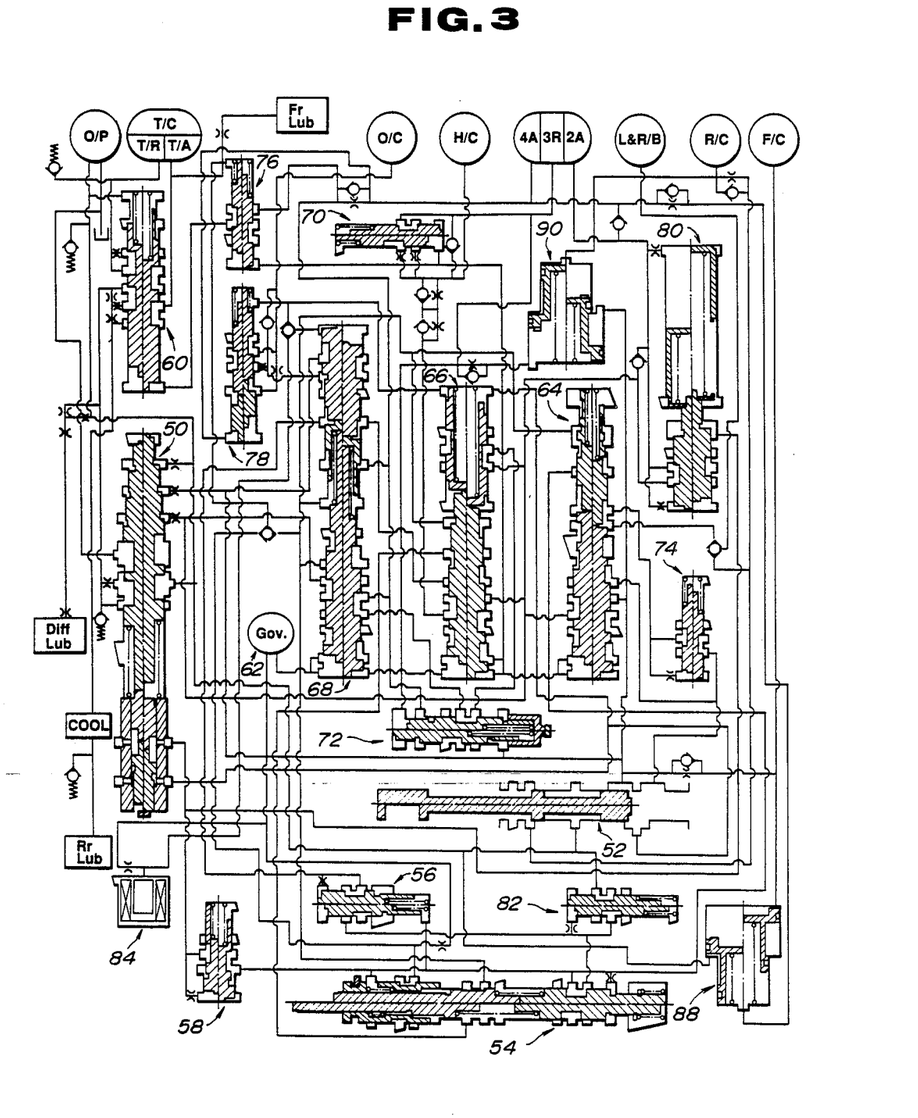
FIG. 3 is a circuit diagram showing the control system which is utilized in the transaxle arrangement shown in FIG. 2 and which includes the valve shown in FIG. 1.

FIG. 2 shows in schematic elevational form, an automatic transaxle which includes a torque converter 12, a planetary gear train and a differential or final drive unit 16. This unit is arranged traversely across the vehicle chassis and is connected to an engine 10 at one end thereof. The torque converter (T/C) in this instance includes a pump impeller 18, turbine runner 20, stator 22 and a lock-up clutch 24. With this arrangement when the lock-up clutch 24 is disengaged torque from the engine crankshaft (no numeral) is supplied by way of the pump impeller 18 to a transmission input shaft 26. However, upon engagement of the lock-up clutch 24 the torque is supplied directly to the input shaft 26.

In this transaxle the lock-up clutch 24 is arranged to be responsive to the pressure differential which exists between an apply chamber A/T and a release chamber T/R. It should be noted that an oil pump 28 which outputs pressurized hydraulic fluid is arranged to be driven by the T/C.

The planetary gear train includes first and second gear units G1, G2. The first unit G1 includes a sun gear S1, an internal or ring gear R1 and pinion gears P1 which mesh with the ring and sun gears. The pinion gears are of course rotatably disposed on a pinion carrier PC1. The second unit G2 similarly includes a sun gear S2, a ring gear R2, pinion gears P2 and a carrier PC2.

The sun gear S1 of the first unit G1 is connected to the input shaft 26 in a manner to undergo synchronous rotation therewith while pinion carrier PC1 and the ring gear R2 of the second unit G2 are connected with a transmission output shaft 30. The ring gear R1 of the first unit G1 is selectively connectable with carrier PC2 by way of the forward oneway cluch F/O and the overrunning clutch O/C. Sun gear S2 is selectively connectable with the input shaft 26 by way of the reverse clutch R/C while the pinion carrier PC2 is arranged to be connectable with the same via a high clutch H/C.

Sun gear S2 can be selectively rendered stationary via the application of a band brake B/B while the pinion carrier PC2 is operatively connected with the parallely arranged low one-way clutch L/O and low and reverse brake L&R/B in a manner which enables the same to be selectively held stationary.

An output gear 32 is fixed to one end of the output shaft 30 and arranged to mesh with an idler gear 34. The latter mentioned gear is fixed to one end of a idler shaft 35 which extends parallel to the input shaft 26 and passes back through the transmission as shown. A reduction gear 36 is provided at the inboard end of the idler shaft 35. This gear meshes with a ring gear 38 of the differential unit 16.

Torque is delivered to the wheels of the vehicle by way of stub shafts 40 and 42. In this instance the shafts 40 and 42 are respectively connected with the forward left and right hand wheels of the vehicle.

Figure 5:
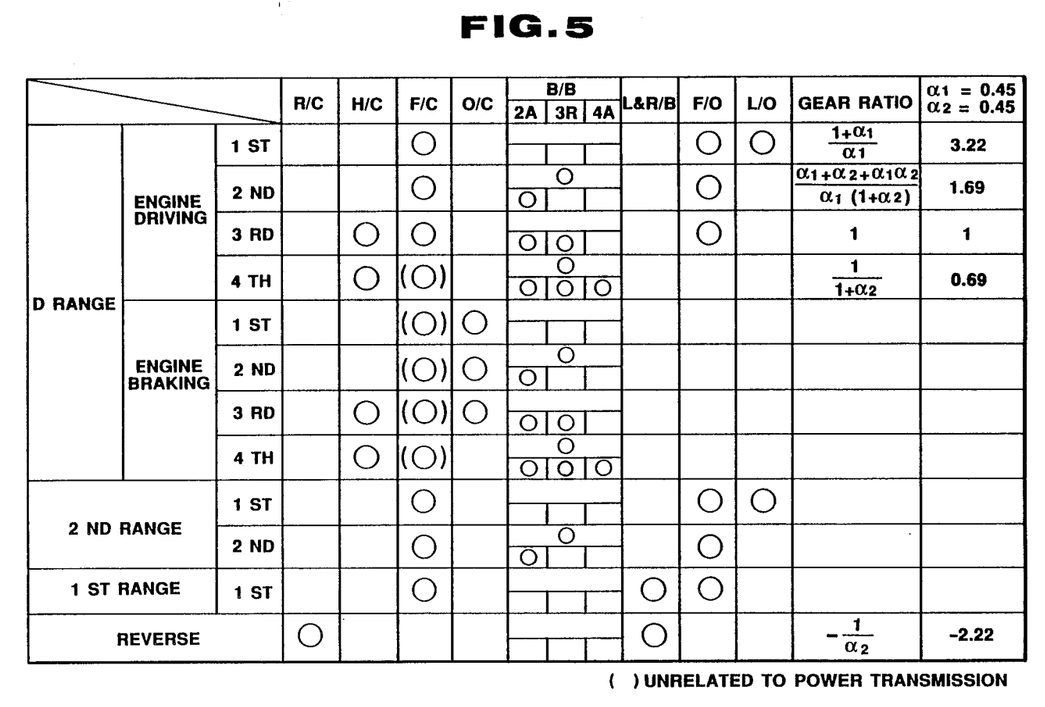
FIG. 5 is a table showing the relationship between the engagement of the friction elements and the gear ratios which are produced in the transmission shown in FIGS. 2 and 3.

With the above described arrangement selective engagement and/or use of the clutches F/C, H/C, O/C, R/C, the brakes B/B and L&R/B and the one-way clutches F/O and L/O it is possible to condition the first and second planetary gear units G1 and G2 to produce four forward and one reverse gear ratios in the manner as depicted in the table shown in FIG. 5.

It should be noted that in this table the circles denote the engagement of an element and or the use of a one-way clutch. In this transmission the engagement of the band brake B/B is controlled by a servo having first, second and third chambers. That is, a second speed apply chamber 2A, a third speed release chamber 3R and a fourth speed apply chamber 4A. In connection with these chambers the circular indicia in the table indicate the chamber being applied with hydraulic pressure. Further, in this table alpha 1 and alpha 2 indicate the ratios of the teeth on the ring gears R1 and R2 and the corresponding sun gears S1 and S2, respectively. The gear ratio defined in the table denote the ratios defined between the rotational speeds of the output and input shafts 30, 26.

With the above described transmission arrangement rotational power or torque is transferred via the gear train from the input shaft 26 to the output shaft 30 and to the final drive or differential unit 16 by way of the output gear 30, the idler gear 34, reduction gear 36 and the ring gear 38. In fourth speed an overdrive condition is established.

Figure 1:
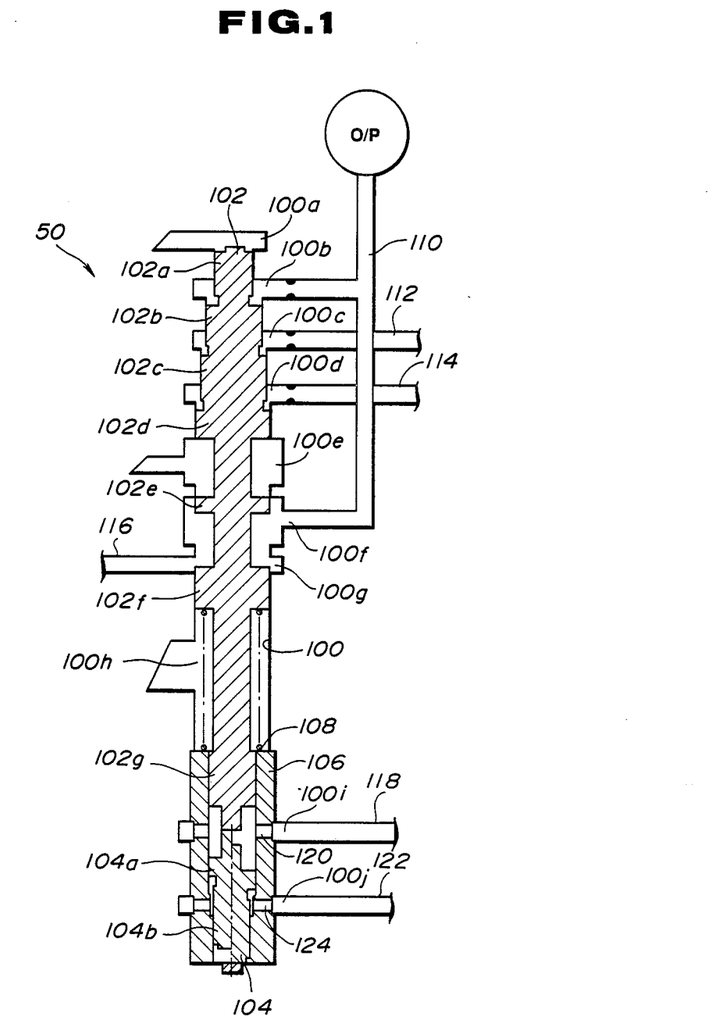
FIG. 1 is a cross-sectional elevational view of an embodiment of a line pressure regulator valve according to the present invention.

In order to control the above described gear train the hydraulic spool valve system of the nature shown in FIG. 1 is used.

This system includes a pressure regulator valve 50, a manual valve 52, a throttle valve 54, a throttle modifier valve 58, a lock-up control valve 60, a governor valve 62, a 1-2 shift valve 64, a 2-3 shift valve 66, a 3-4 shift valve 68, a 3-2 timing valve 70, a 4-2 sequence valve 72, a fixed first speed pressure reducing valve 74, a speed cut-back valve 76, an overrunning clutch control valve 78, a 1-2 accumulator valve 80, a kickdown modifier valve 83, an N-D accumulator 88 and a servo release accumulator 90.

FIG. 1 shows an embodiment of a pressure regulator valve 50 according to the present invention. In this arrangement a first spool valve element 102, a second spool valve element 104, a sleeve 106 and a spring 108 are disposed in a stepped bore 100. In actual fact the first spool valve element 102 is formed of two elements which abut one and other during opertion of the valve and which act as single unit. However, for simplicity of illustration and explanation it will be assumed that the spool valve element 102 is a single integral unit. In this embodiment the sleeve 106 is fixed in a predetermined position within the valve bore 100. On the other hand, the two spool valve elements 102, 104 and the spring 106 are arranged to be reciprocatively movable in the axial direction of the bore. The bore is formed with ports 100a to 100j. Ports 100a, 100e and 100h act as drains. Port 100b is connected with a source of hydraulic fluid under pressure which in this case takes the form of an oil pump O/P via a conduit 110 through which line pressure is transmitted. Port 100c is arranged to be supplied with line pressure when the transmission is conditioned to produce any forward speed, by way of conduit 112. Port 100d is arranged so that when the transmission is in second speed and above, line pressure is supplied thereto via conduit 114. Port 100f is constantly supplied with line pressure through conduit 110. Port 100g is arranged to supply hydraulic fluid to the torque converter 12 by way of conduit 116. Port 100i is connected with the pressure modifier valve 58 by way of conduit 118 and supplied with the pressure discharged therefrom. The sleeve 106 is provided with a radial bore 120 which communicates port 100i with the bore defined with the sleeve. A second radial bore 124 formed in the sleeve communicates with the port 100j. The latter mentioned port is communicated with the manual valve 52 by way of conduit 122 and arranged to be supplied with hydraulic fluid when the manual valve is set in the manual second speed range.

The first spool valve element 102 is formed with lands 102a–102g. Lands 102a, 102b, 102c and 102d are such as to have sequentially increasing diameters. Lands 102d, 102e and 102f are to have the same diameters. On the other hand, land 102g is arranged to have a diameter which is less than that of land 102f.

The second spool valve element 104 is provided with lands 104a and 104b. Land 104a has a larger diameter than land 104b and is also arranged so that its diameter is the same as that of land 102g. Each of the above mentioned lands is arranged to cooperate with the above mentioned ports in the illustrated manner.

The operation of the above described valve is as follows: when the transmission is conditioned to produce D range, conduit 122 is supplied with what shall be referred to as "second range pressure" while conduit 118 is supplied with the modified pressure from the pressure modifier valve 58. In addition to this conduits 110, 112 and 114 are supplied with line pressure. However, it should be noted that when the transmission is in first speed, conduit 114 is drained.

Under these conditions the modified pressure supplied through conduit 118 is transmitted through port 100i, and radial bore 120 into the bore 100 in a manner to act on the land 102g of the first spool valve element and land 104a of the second spool valve element. This results in the second spool valve element 104 being biased downwardly (as seen in the drawings) to assume the position illustrated by the right hand sectional half. Ports 100b, 100c and 100d are supplied with line pressure. The pressure acting on the pressure differential areas defined between lands 102a and 102b, 102b and 102c and 102c and 102d produce a bias which tends to move the first spool valve element 102 downwardly (as seen in the drawings). The lands 102e and 102f of the first spool valve element 102 arranged cooperate with the bore wall in a manner to control the amount of hydraulic fluid which is allowed to drain from port 100f, which is supplied with line pressure, to ports 100e and 100g. That is to say, as the first spool valve element 102 is biased downwardly, the opening defined between the bore wall and lands 102e and 102f increases and the amount of hydraulic fluid which is permitted to drain via ports 100e and 100g increases. In accordance with the increased drainage, the level of the pressure prevailing in conduit 110 is reduced. Conversely, in the event that the first spool valve element 102 moves upwardly in the bore 100 the amount of drainage is reduced and the level of the pressure in conduit 110 increases.

In connection with the upward movement of the first spool valve element 102, it will be noted that spring 108 is arranged so that the bias produced by the same and the bias produced by the modified pressure acting on the lower face of land 102g are arranged to act against the downward bias produce by the pressure in conduit 110. As the level of the modified pressure varies with the level of the throttle pressure, the equilibrium which is established between the upwardly and downwardly acting forces is such as to control the level of the line pressure (while the transmission is set in D range) in the manner shown by the solid line trace in FIG. 4. However, it should be noted that, as mentioned before, when the transmission is conditioned produce first speed conduit 114 is drained and as a result, the level of line pressure in first speed is higher than that illustrated.

When the transmission is set in second speed range the operation of the invention is as follows: when the manual valve is set in second speed range, conduit 122 is supplied with line pressure. This pressure is supplied to port 100j and is transmitted via the second radial bore 124 into bore defined in sleeve 106. This pressure then acts on the pressure differential area defined between lands 104a and 104b and produces a force which tends to move the second spool valve element 104 upwardly toward the position shown in the left hand section, and in a manner which tends to increase the level of the line pressure. On the other hand, the modified pressure which is supplied from the pressure modifier valve 58 to port 100i, acts on the upper face of land 104a in a manner which produces a downwardly acting force. This of course tends to reduce the level of the line pressure.

When the level of the modified pressure is below a predetermined limit the force produced which tends to move the second spool valve element 104 downwardly is less than the force produced by the pressure which is supplied to port 100j via conduit 122. As a result the second spool valve element 104 is moved to the position shown by the left hand section. As shown, in this position the upper or inboard end of the second spool valve element 104 engages the lower end of the first spool valve element 102. Under these conditions, the first spool valve element 102 is biased upwardly by the force produced by the pressure acting on the pressure differential area defined between lands 104a and 104b. This negates the effect of the pressure supplied from the pressure modifier valve 58 and the line pressure is controlled in accordance with the equilibrium which is established between the upwardly acting force of the spring 108 and the downwardly acting forces produced by the pressure in conduit 110 acting on the previously mentioned three pressure differential areas. Accordingly, the level of the line pressure is controlled to a given fixed level which which is determined by the spring constant of the spring 108 and the values of the above mentioned pressure differential areas.

As will be appreciated from the broken line trace shown in FIG. 4, the level of the line pressure which is produced under these conditions while the level of the pressure produced by the pressure modifier valve 58 is below the above mentioned predetermind level, is higher than that produced when the transmission is conditioned to produce D range.

However, when the level of the modified pressure prevailing in conduit 118 exceeds the predetermined value, the downwardly acting force exceeds the upwardly acting one produced by the pressure supplied through conduit 122 and the first and second spool valve elements 102, and 104 separate. Viz., the second spool valve element 104 is induced to move toward the position shown by the right hand section (FIG. 1). In response to this, the same conditions produced during D range operation are induced and the level of line pressure varies in the same manner as in the case of D range operation.

Figure 4:
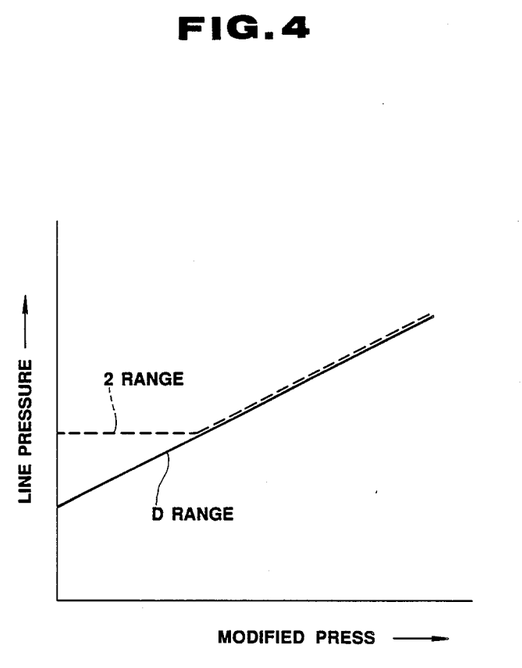
FIG. 4 is a graph which shows the line pressure generation characteristics obtained with the present invention.

In brief, as shown in FIG. 4 during D range operation the level of the line pressure is varied in accordance with the change in modified pressure produced by the pressure modifier valve 58. When the transmission is set in the manual second speed range and the level of the modified pressure is below the above mentioned predetermined level due to the throttle valve being opened less than a given angle, the level of the line pressure is controlled to a pretermined high level. Accordingly, under engine braking conditions the correct amount of torque can be transmitted by the band brake and slippage of the said friction element is prevented. Further, during a D-2 range select, shift shock can be attenuated to an appropriate degree.

On the other hand, when the throttle opening increases and the pressure outputted by the pressure modifier valve 58 increases to the point of exceeding the predetermined level, the line pressure is controlled in the same manner as in the case when the transmission is conditioned to produce D range. Accordingly, friction elements (viz., the band brake) can be pressurized to levels where the appropriate amount of torque can be transmitted without improper operation such as slippage, even when the throttle valve is opened to its maximum degree.

What is claimed is:

1. In a line pressure regulator valve for a hydraulic control system of an automatic transmission:
    a first spool valve element for regulating the level of line pressure;
    a second spool valve element, said second spool valve element having an end which is abuttable against the end of said first spool valve element, said second spool valve element having first and second lands, said first and second lands defining a pressure differential area to which a mode selection pressure is exclusively applied in a manner to bias the second valve toward and into abutment with said first spool valve element; and
    means defining a chamber to which the abuttable ends of said first and second spool valve elements are exposed and to which a pressure is supplied which varies with the torque being applied to the transmission and which exclusively biases the first and second spools apart.

2. A line pressure regulator valve as claimed in claim 1 further comprising a single spring, said spring being disposed in a bore in which said first spool valve element is reciprocatively disposed, said spring being arranged to bias said first spool valve element away from said second spool valve element.

3. A line pressure regulator valve as claimed in claim 2 wherein said line pressure regulator valve further comprises a sleeve, said sleeve being fixedly disposed in a bore in which said first spool valve element is reciprocatively disposed, said sleeve including a stepped bore in which said second spool valve element is reciprocatively disposed.

4. A line pressure regulator valve as claimed in claim 3 wherein said spring is interposed between said sleeve and a land of said first spool valve element.

5. A line pressure regulator valve as claimed in claim 4 wherein said first spool valve element has four lands, said four lands defining three different pressure differential areas, said three pressure differential areas being arranged such that upon being exposed to hydraulic pressure, said pressure differential areas bias said first spool valve element toward said second spool valve element and against the bias of said spring.

6. A line pressure regulator valve as claimed in claim 5 wherein one of said three pressure differential areas is exposed to line pressure only while the transmission is conditioned to produce forward gears.

7. A line pressure regulator valve as claimed in claim 5 wherein one of said three pressure differential areas is exposed to a hydraulic pressure when the transmission is conditioned to produce forward gears other than first gear.

8. A line pressure regulator valve as claimed in claim 1 wherein said mode selection pressure is generated when the transmission is conditioned to produce second gear.

9. In a transmission which can be selectively induced to produce first and second modes of operation, said second mode of operation being one in which engine braking can be produced:

a pump which discharges hydraulic pressure under pressure;

a first source of pressure indicative that said second mode of operation has been selected;

a second source of pressure which varies with the torque applied to said transmission; and a pressure regulator valve for regulating the pressure of the hydraulic pressure discharge by said pump, said regulator valve comprising:

a first spool valve element reciprocatively disposed in a bore, said first spool valve element being arranged to control the level of the hydraulic pressure discharged by said pump, said first spool valve element defining a first chamber in said bore which is supplied with the regulated pressure produced by said regulator valve and arranged in a manner wherein the pressure which prevails in said first chamber produces a bias which tends to move said first spool valve element in a first direction in said bore, said first spool valve element being arranged so that when it is moved in said first direction, the amount of pressure which is relieved is increased and the level of the regulated pressure is reduced;

a second spool valve element reciprocatively disposed in said bore, said second spool valve element including means which defines a pressure differential area, said second mode indicating pressure being exclusively applied to said pressure differential area, said second mode indicating pressure producing a bias which tends to move said second spool valve element in a second axial direction in said bore, said second spool valve element having a first end which is engageable with a first end of said first spool valve element, said first and second ends being arranged in said bore in a manner to define a second chamber to which said torque indicative pressure is exclusively supplied, said torque indicative pressure producing biases which tend to move said first spool valve element in said second only in said first axial direction; and spool valve element only in said first axial direction; and a spring, said spring being disposed in said bore and arranged to bias said first spool valve element in said second axial direction, said first and second spool valve elements and said spring being arranged so that when said torque indicative pressure is below a predetermined level and said transmission is conditioned to produce said second mode of operation, and said second mode indicative pressure is applied to said pressure differential area, the first end of said first spool valve element is directly engaged by the first end of said second spool valve element whereafter the second spool valve element directly applies a bias to said first spool valve element and operation of said first spool valve element is modified such that the regulated pressure discharged from said regulator valve is held essentially constant until said torque indicative pressure rises to said predetermined level.

10. A hydraulic control system for an automatic transmission comprising:

a plurality of friction elements;

a pump for discharging hydraulic fluid under pressure;

a manual valve which can be set in at least first and second positions, said first position being arranged to condition said transmission to selectively engage said plurality of friction elements in a manner to produce a first mode of transmission operation wherein automatic shifting between a plurality of gear ratios is possible, said second position being arranged to condition said transmission in a manner to produce a second mode of transmission operation wherein the top speed ratio of the transmission is inhibited and engine braking is rendered possible, said manual valve being arranged to produce a first control signal when set in said second position;

a throttle pressure control arrangement which produces a second control pressure which varies in accordance with the torque applied to said transmission; and a line pressure regulator valve for controlling the discharge of said pump in a manner to develop and control the level of a line pressure which is used to engage said friction elements, said line pressure regulator valve comprising:

a first spool valve element for regulating the level of the line pressure, said first spool valve element being responsive to the level of the line pressure produced by said line pressure regulator valve in a manner to be feedback controlled by the same;

a second spool valve element which is engageable with said first spool valve element, said second spool element having first and second lands, said first and second lands defining a pressure differential area which can be exposed to said first control pressure in a manner to bias the second spool valve element toward said first spool valve element; and means defining a chamber to which the engageable ends of said first and second spool valve elements are exposed and which is supplied with said second control pressure, said second control pressure biasing said first and second spool valve elements apart.

* * * * *